United States Patent
Ebsen et al.

(10) Patent No.: US 9,823,841 B2
(45) Date of Patent: Nov. 21, 2017

(54) ASSOCIATING KEYS WITH DATA AND COMPUTE OBJECTS IN A STORAGE COMPUTE DEVICE

(71) Applicant: Seagate Technology LLC, Cupertino, CA (US)

(72) Inventors: David Scott Ebsen, Minnetonka, MN (US); Ryan James Goss, Prior Lake, MN (US); Jeffrey L. Whaley, Minneapolis, MN (US); Dana Simonson, Owatonna, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 497 days.

(21) Appl. No.: 14/486,201

(22) Filed: Sep. 15, 2014

(65) Prior Publication Data
US 2016/0077978 A1     Mar. 17, 2016

(51) Int. Cl.
*G06F 12/14*     (2006.01)
*G06F 3/06*      (2006.01)

(52) U.S. Cl.
CPC .................................. *G06F 3/06* (2013.01)

(58) Field of Classification Search
CPC .......... G06F 12/145; G06F 21/62; G06F 3/06; G06F 12/1416; G06F 2212/1052
USPC ........................................................ 711/164
See application file for complete search history.

(56) References Cited

U.S. PATENT DOCUMENTS

| | | |
|---|---|---|
| 6,298,401 B1 | 10/2001 | Anderson |
| 8,161,013 B2 | 4/2012 | Urmston et al. |
| 8,635,402 B2 | 1/2014 | Torii |
| 9,256,657 B1 * | 2/2016 | Evenson ........... G06F 17/30569 |
| 2011/0138131 A1 | 6/2011 | Regni et al. |

* cited by examiner

*Primary Examiner* — Jasmine Song
(74) *Attorney, Agent, or Firm* — Hollingsworth Davis, LLC (57) ABSTRACT

A definition is received of at least one data object and a compute object from a host at a storage compute device. A first key is associated with the at least one data object and a second key is associated with the compute object. A command is received from the host to perform a computation that links the first and second keys. The computation is defined by the compute object and acts on the data object. The computation is performed via the storage compute device using the compute object and the data object in response to the command.

19 Claims, 5 Drawing Sheets

ASSOCIATING KEYS WITH DATA AND COMPUTE OBJECTS IN A STORAGE COMPUTE DEVICE

SUMMARY

The present disclosure is related to associating keys with data and compute objects in a storage compute device. Methods, apparatuses, systems, and computer-readable medium facilitate receiving a definition of at least one data object and a compute object from a host at a storage compute device. A first key is associated with the at least one data object and a second key is associated with the compute object. A command is received from the host to perform a computation that links the first and second keys. The computation is defined by the compute object and acts on the data object. The computation is performed via the storage compute device using the compute object and the data object in response to the command.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

Some computational tasks are well suited to be performed using massively distributed computing resources. For example, data centers that provide web services, email, data storage, Internet search, etc., often distribute tasks among hundreds or thousands of computing nodes. The nodes are interchangeable and tasks may be performed in parallel by multiple computing nodes. This parallelism increases processing and communication speed, as well as increasing reliability through redundancy. Generally, the nodes are rack mounted computers that are designed to be compact and power efficient, but otherwise operate similarly to desktop computer or server.

For certain types of tasks, it may be desirable to rearrange how data is processed within the individual nodes. For example, applications such as neuromorphic computing, scientific simulations, etc., may utilize large matrices that are processed in parallel by multiple computing nodes. In a traditional computing setup, matrix data may be stored in random access memory and/or non-volatile memory, where it is retrieved, operated on by relatively fast central processor unit (CPU) cores, and the results sent back to volatile and/or non-volatile memory. It has been shown that the bus lines and I/O protocols between the CPU cores and the memory are a bottleneck for some types of computation.

This disclosure generally relates to use of a data storage device that performs internal computations on data on behalf of a host, and is referred to herein as a storage compute device. While a data storage device, such as a hard drive, solid-state drive (SSD), hybrid drive, etc., generally include data processing capabilities, such processing is related to the storage and retrieval of user data. So while the data storage device may perform some computations on the data, such as compression, error correction, etc., these computations are invisible to the host. Similarly, other computations, such as logical-to-physical address mapping, involve tracking host requests, but are intended to hide these tracking operations from the host.

While a storage compute device as described herein may be able to perform as a conventional storage device, e.g., handling host data storage and retrieval requests, such devices may include additional computational capability that can be used for certain applications. For example, scientific and engineering simulations may involve solving matrix equations on very large matrices. Even though the matrices may be sparse, and therefore amenable to a more concise/compressed format for storage, the matrices may still be so large as to prevent computing a solution using the random access memory (RAM) of a single computing node.

One solution to solving these large matrix problems is to distribute the solution among a number of nodes coupled by a network. Each node will solve part of the problem, and various internode messages are passed to coordinate operations and shared data between the nodes. While this can alleviate the need for large amounts of RAM on each node, it has been found that in some cases this does not effectively use processing resources. For example, the central processing units (CPUs) may spend significant amounts of time waiting for network input/output (I/O) and be underutilized as a result.

It generally accepted that compute performance can be improved by keeping the data "close to" the processors that operate on the data. This closeness refers both to physical proximity and reduction in the number of different communications channels and protocol layers that lie between the data in memory and the processor. While CPU and RAM might qualify as close to one another (particularly when using hierarchical memory caches), the size of system RAM may be limited for some problems. In such a case, the system bottlenecks occur in slower channels (e.g., disk drives, network interfaces) moving data in and out of RAM as needed.

For problems and applications that work on very large sets of data, a local non-volatile memory device may be used to store the data sets, as well as perform some or all of the calculations. While the speed of currently available non-volatile RAM (NVRAM) is appreciably slower than currently available dynamic RAM (DRAM), for problems with large data sets, an increase in performance may be seen by performing the computations on the storage device itself. While the processor and memory resident on typical storage devices may be slower than CPU and RAM of typical computers, the amount of NVRAM available can be orders of magnitude greater than RAM for similar cost. Further, the storage device can move large amounts of between its non-volatile memory and its local processor more quickly that it could move the same data to a CPU. Internal data processing does not have to deal with contention, translation, protocols, etc., that is involved in moving data between the host interface of the storage device and the CPU cores.

Figure 1:
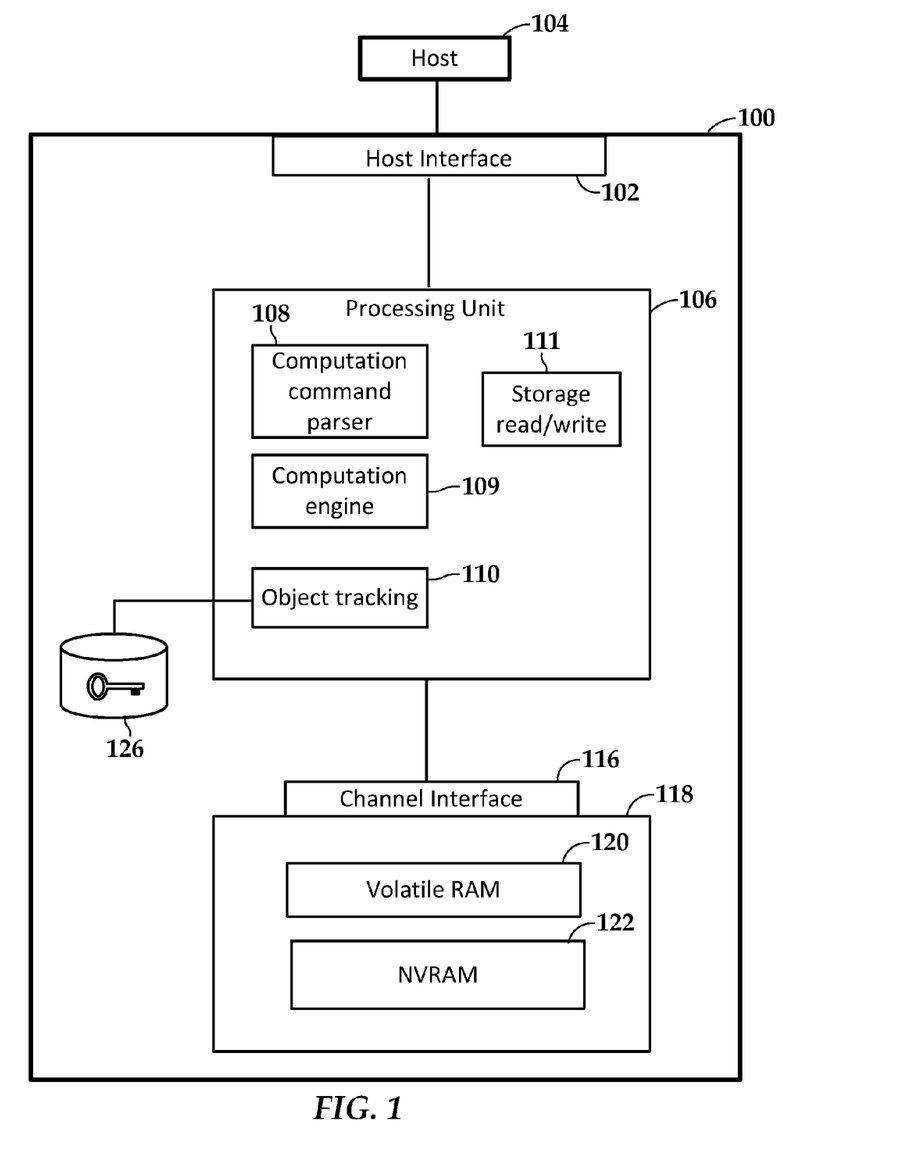
FIG. 1 is a block diagram of a storage compute device according to an example embodiment.

In FIG. 1, a block diagram shows a storage compute device 100 according to an example embodiment. The storage compute device 100 may provide capabilities usually associated with data storage devices, e.g., storing and retrieving blocks of data, and may include additional computation abilities as noted above. Generally, the storage compute device 100 includes a host interface 102 configured to communicate with a host 104. The host interface 102 may use electrical specifications and protocols associated with a legacy hard drive host interface, such as SATA, SaS, SCSI, PCI, Fibre Channel, etc.

The storage compute device 100 includes a processing unit 106. The processing unit 106 includes hardware such as general-purpose and/or special-purpose logic circuitry configured to perform functions of the storage compute device 100, including functions indicated in functional blocks 108-112. Functional block 111 provides legacy storage functionality, such as read, write, erase, and verify operations affecting stored data. Blocks 108-110 represent specialized functionalities that allow the storage compute device 100 to provide internal computations on behalf of the host 104.

Block 108 represents a command parser that manages object-specific and computation-specific communications between the host 104 and storage compute device 100. For example, the block 108 may process commands that define objects (matrices, vectors, scalars, sparse distributed representations) and operations (e.g., scalar/matrix mathematical and logical operations) to be performed on the objects. A computation engine 109 performs the operations on the objects, and may be specially configured for a particular class of operation. For example, if the storage compute device 100 is configured to perform a set of matrix operations, then the computation engine 109 may be optimized for that set of operations. The optimization may include knowledge of how best to store and retrieve objects for the particular storage architecture used by the storage compute device 100.

The functional blocks 108-110 may access persistent storage, by way of a channel interface 116 that provides access to a memory unit 118. There may be multiple channels, and in such a case there may be a dedicated channel interface 116 and computation engine 109 for each channel. The memory 118 may include both volatile memory 120 (e.g., DRAM and SRAM) and non-volatile memory (e.g., flash memory, magnetic media) 122. The volatile memory 120 may be used as a cache for read/write operations performed by read/write block 111, such that a caching algorithm ensures data temporarily stored in volatile memory 120 eventually gets stored in the non-volatile memory 122. The computation blocks 108-110, and 112 may also have the ability to allocate and use volatile memory for calculations. Intermediate results of calculations may remain in volatile memory 120 until complete and/or be stored in non-volatile memory 122.

In this embodiment, an object tracking block 110 facilitates tracking storage and compute objects on behalf of the command parser block 108 and computation engine 109. The object tracking block 110 associates keys with the data object and compute objects used in the computations. At least some of the objects are defined by the host 104, although it may be the object tracking block 110 that generates unique keys and associates them with the objects. The objects are stored in memory 118 as are the keys, which may utilize a database 126 for structured access to the keys. The database 126 may provide a key-value mapping, e.g., providing an address where the object is stored based on a provided key.

In one configuration, the host 104 communicates definitions used to create the data and compute objects stored on the storage compute device 100. The definition may include the actual data (e.g., floating point or integer values, text characters), as well as other metadata that describes a type and structure of the data (e.g., matrix, scalar, collection, etc.). The object data is stored in the memory 118 at an address. The storage compute device 100 generates unique keys for the objects and stores the keys in the database 126. The keys may be associated with at least the address in the database 126, and other metadata may also be stored with the keys, such as object size, object type, linkages to other objects, etc.

After storage of the objects, commands are received from the host 104 to perform a computation using the objects. The commands will include keys that are associated with the stored objects. The stored objects are accessed by looking up the keys in the database 126, which facilitates finding the objects in memory 118. At least one of the objects in the command will reference at least one compute object, and another of the keys will reference at least one data object. The computation (e.g., the mathematical operations performed, the handling of results) is defined by the compute object and performed on the at least one data object via the computation engine 109. The computation may involve streaming data from the memory unit 118 directly to one or more computation engines 109 to fully utilize the channels of the channel interface 116. As part of the computation, linkages are made between at least the keys of the compute objects and keys of the data objects. These linkages may also be stored in the database 126, e.g., via a junction table, also sometimes referred to as a link table, join table, etc.

The computation defined by the compute object may include a mathematical transformation (e.g., inverse, transpose, scale) of the at least one data object. This may involve creating a new copy of the transformed object or replacing the at least one data object with the transformed version. The compute object may include directives as to the persistence of resultant data objects used as part of the computation. For example, directives may state whether resultant objects are temporary, intermediate calculations and can be immediately discarded after use or whether objects may need to be reused in subsequent calculations and should be retained. The computation engine 109 may also make independent determinations of whether intermediate objects should be retained or not based on, e.g., whether objects is referenced in unprocessed commands in a command queue, an amount of available storage space, and other device specific operational parameters that the host may or may not be aware of. The storage compute device that performs the operation would also decide when and how long to store the result of the computations based on these and other factors.

Often a computation includes a mathematical combination of two or more data objects. For purposes of this disclosure, Boolean operations may also be considered mathematical operations. This may also involve intermediate objects, e.g., $Y=A*B*C$ may first involve calculating $X=A*B$ then calculating $Y=X*C$, where Y is the result of interest that will be read back by the host. Where the objects are too large to compute in RAM, the object X may need to be stored in persistent memory. In such a case, X may be an intermediate value that is immediately deleted after Y is determined, or may be retained based on factors described above. In either event, the value of Y is a result data object of interest to the host, and so will be associated with its own key. The key of Y will be linked at least to the computation object that defined the $Y=A*B*C$ operation, and may be linked, either directly or indirectly (e.g., via the computation object) to keys of the other data objects A, B, and C.

For large matrix operations, there may be a number of different optimizations known that reduce computation times. For example, sparse matrices are mostly zero, and so only the operands that correspond to non-zero matrix elements need be considering in some calculations. The selection of an optimization may depend on, among other things, the operation to be performed and the size and format of the data objects operated on. Because the compute and data objects may be reused for subsequent calculations, the optimizations found for one operation may be associated with data objects and/or compute objects. This may be accomplished by storing metadata describing the optimization with the keys used to access the objects. In such a case, if a second command to perform a second computation that references the keys having such optimization metadata, the optimization can be reused with the second computation. This may further involve determining whether the second computation is similar enough to the previous operation (e.g., object size and arrangement) such that the optimization will likely be effective if reused.

Figure 2:
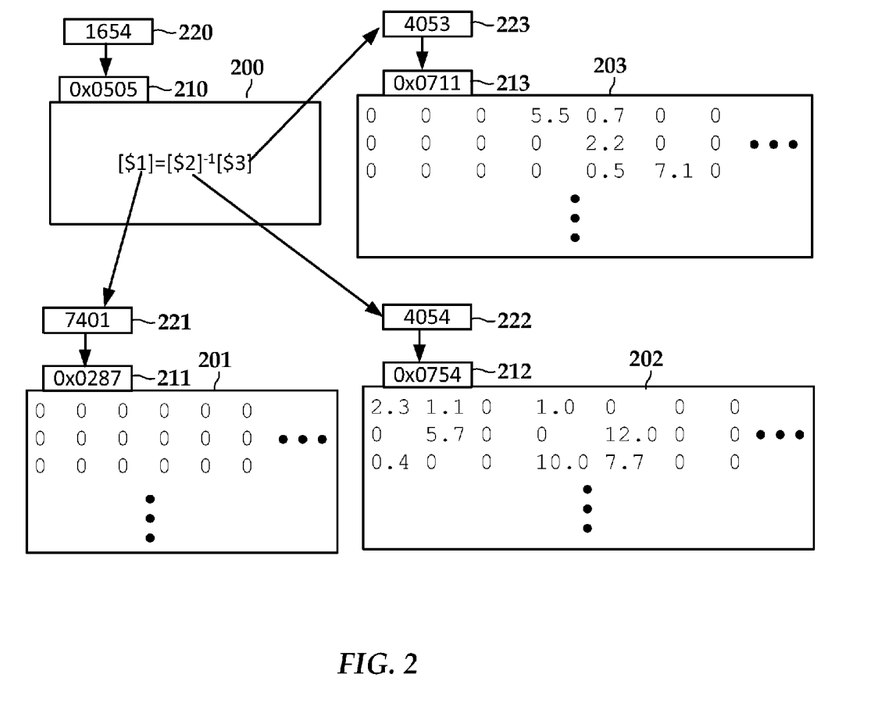
FIG. 2 is a block diagram showing data and compute objects according to an example embodiment.

In FIG. 2, a block diagram illustrates examples of objects 200-203 used with a storage compute object according to an example embodiment. Object 200 is a compute object that defines a matrix operation in the form of $A=B^{-1}C$. The variables are preceded by a '$' symbol, and are linked via a database to data objects. Data object 201 is where the result is stored, and is shown here as empty, e.g., the operation has not been performed yet. Data objects 202, 203 are variables operated on to determine the result data object 201.

The data objects 200-203 are stored in respective memory locations 210-213, which may be logical or physical memory addresses. The objects 200-203 are further accessed via respective keys 220-223, which may be mapped to addresses 210-213 as indicated. It should be noted that the addresses 210-213 themselves can be used as keys, as they are presumably unique. However, a storage compute device may need more than a starting address to identify an object. Additional data such as size of the object, whether or not the object is stored in a contiguous block, etc., may also be stored via the storage compute device. As such, the keys 220-223 may be a more appropriate abstraction of the objects. For example, more than one key may be associated with the same object, which may not be possible if an address is used.

As seen in FIG. 2, the objects 200-203 can be reused in other calculations by remapping (or adding new links) compute objects to data objects. This can be done by preparing a command queue that lists keys in a particular order. For example, a command such as {<compute_key>: <data_key1>,<data_key2>, . . . } may be sent by the host. In the example of FIG. 2, the command {1654:7401, 4054, 4053} would cause the illustrated calculation to occur. This compact representation may be useful in reusing the objects. For example, a subsequent command such as {1654:7401, 4073, 4072} may cause compute object 200 to be reused on different data objects (not shown), where the previous result stored in object 201 (and indicated by key 221) is overwritten. It will be appreciated that even if the subsequent command has a result object 201 that is a different data size than the data previously stored at address 211, the storage compute device can remap the key 221 to a different memory range without the host having to be aware of the remapping.

Figure 3:
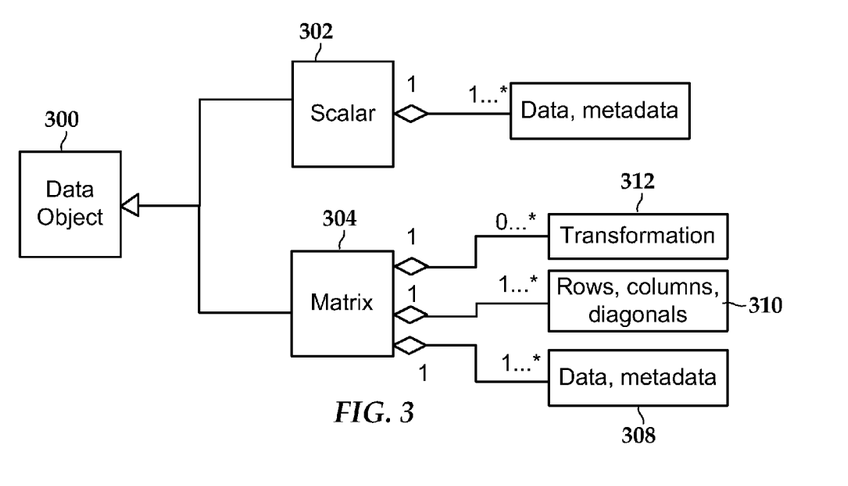
FIGS. 3-4 are block diagrams illustrating objects according to example embodiments.

In FIG. 3, a Unified Modeling Language (UML) block diagram illustrates data objects according to an example embodiment. Two objects 302, 304 inherit from a generic Data object 300, namely a Scalar object 302 and a Matrix object 304. These objects 302, 304 are presented for purposes of illustration, and a much larger set of specific objects (e.g., tables, sets, trees, etc.) may inherit from the Data object 300. In additional, multiple levels of inherency may be used. For example, a Vector object (not shown) may inherit from the Matrix object 304, or vice versa.

Example data of the objects 302, 304 include at least the actual data 306, 308 that the object stores (e.g., floating point numbers) and metadata (e.g., whether the object is constant). The Matrix object 304 also includes other data structures such as indicators of rows, columns, and diagonals 310 and a transformation object 312. The transformation object 312 may include at least an indicator of what transformations are possible. For example, a matrix cross product may only be performed on a 3×3 matrix, and other operations may only be performed on square matrices. The transformation object 312 may also include a reference to an instantiation of a Matrix object 304 that stores the transformed matrix.

Figure 4:
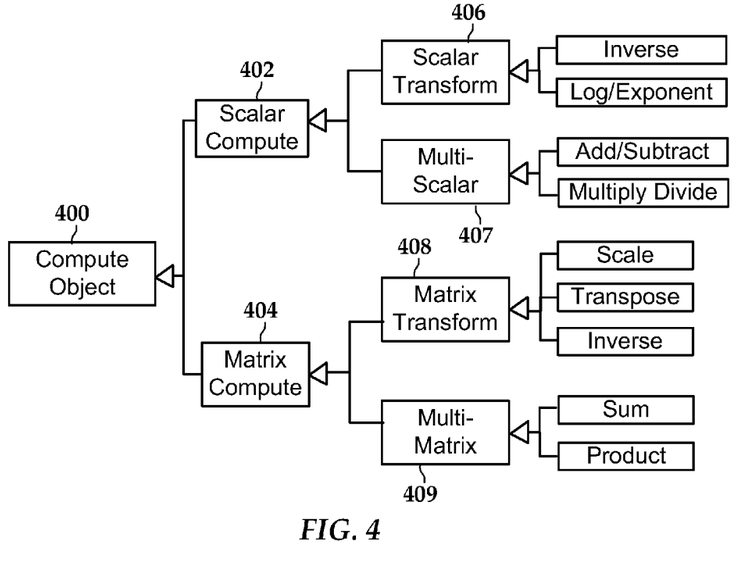

In FIG. 4, a UML block diagram illustrates compute objects according to an example embodiment. These objects may be used by the host and/or storage compute device to assist in abstracting the compute operations. This abstraction can be used to communicate objects from the host to the storage compute device (and vice versa) and execute computations on the storage compute device. Two objects 402, 404 inherit from a generic Compute object 400, namely a Scalar Compute object 402 and a Matrix Compute object 404. Additional objects 406-409 in the hierarchy may be further defined based on single operand or multiple operand. These compute objects 402, 404, 406-409 are presented for purposes of illustration, and a much larger set of compute objects (e.g., set operations, statistical computations, Boolean operations) may inherit from the Compute object 400.

The compute objects in FIG. 4 may be combined together to form complex equations. For example, if an expression of A*(B+C) is formed (where A, B, and C can be matrices or scalars), an Addition object (e.g., ScalarAddition, MatrixAddition) may be instantiated as Object1=new Addition(B, C). A Multiplication object (e.g., ScalarMultiplication, Matrix Multiplication) can be instantiated as Object2=new Multiplication(A, Object1). Execution of the computation can be invoked by calling a method such as Object2.compute( ). If this method is called on the host, it can cause the appropriate command to be sent to the storage compute device, e.g., loading the data and compute objects the storage compute device (if not already stored there), and executing the computation using keys that identify the data and compute objects. If this method is called on the storage compute device, it can send mathematical operator instructions to one or more computation engines and begin loading data from memory to the computation engines based on keys and associated addresses to perform the mathematical operation.

In the illustrated embodiments, keys and objects are shown stored separately, e.g., placing the compute/data objects in non-volatile memory and the keys in a database. In other configurations, an object can contain both data and keys to identify operations to be performed on the data. For example, the compute object 200 in FIG. 2 may store the keys 221-223 used to indicate data objects 201-203. The keys 221-223 may still be stored in a database, e.g., to facilitate locating addresses 211-213 during calculations.

Figure 5:
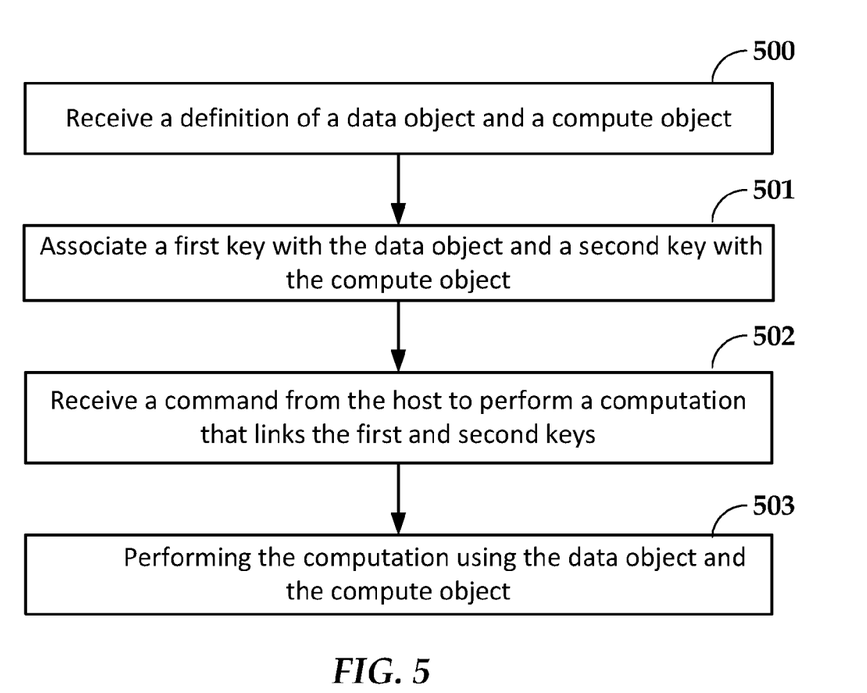
FIG. 5 is a flowchart illustrating a method according to an example embodiment.

In reference now to FIG. 5, a flowchart illustrates a method according to an example embodiment. The method involves receiving 500 a definition of at least one data object and a compute object from a host at a storage compute device. First and second keys are associated 501 with the data object and the compute object, respectively. A command is received 502 from the host to perform a computation that links the first and second keys. The computation is defined by the compute object and being performed on the at least one data object via the storage compute device. The computation is performed 503 using the data object and the compute object in response.

Figure 6:
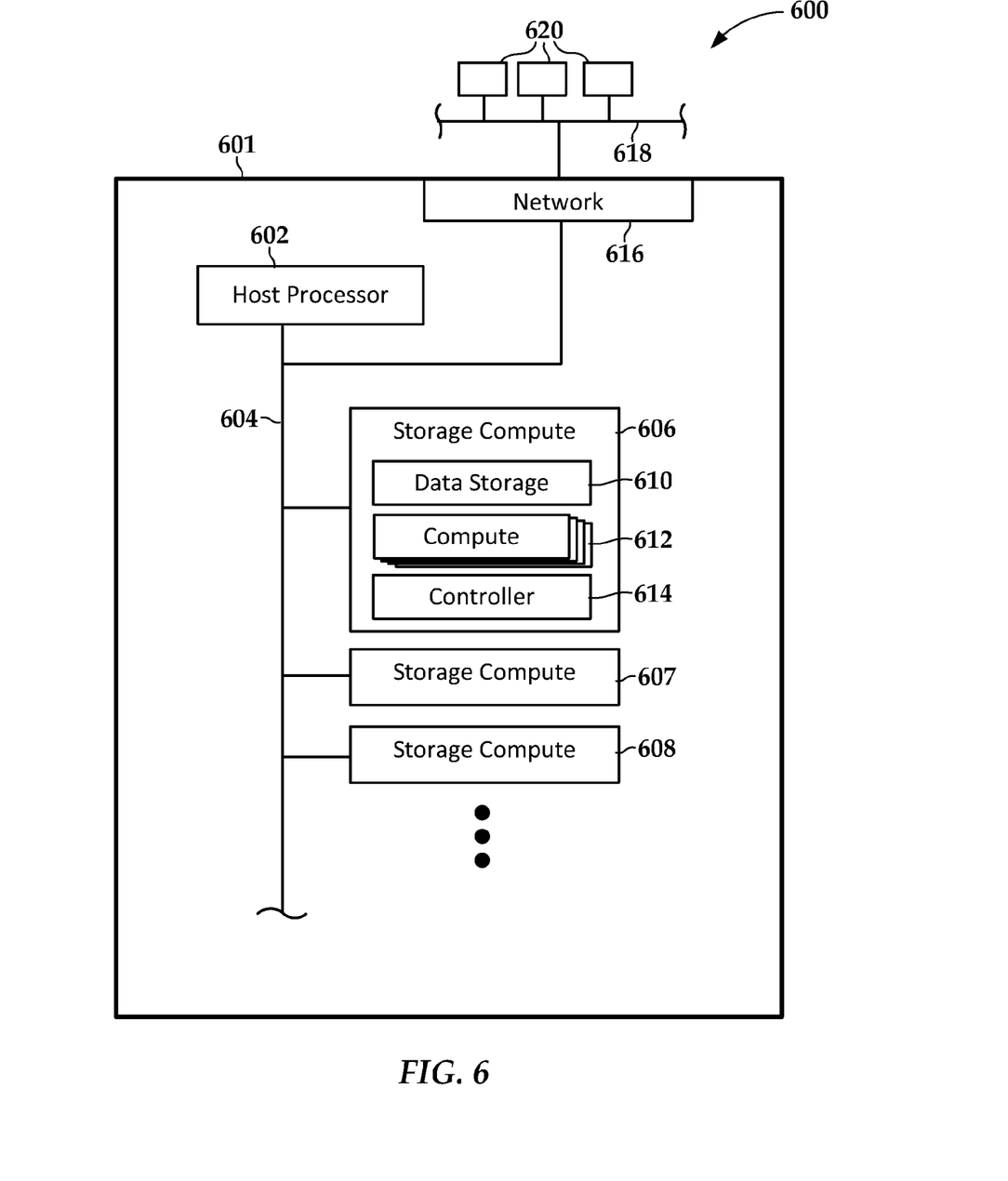
FIG. 6 is a block diagram that illustrates a system according to an example embodiment.

In reference now to FIG. 6, a block diagram illustrates a system 600 according to an example embodiment. The system includes a host device 601 with a host processor 602 that is coupled to a data bus 604. The data bus 604 may include any combination of input/output transmission channels, such as southbridge, PCI, USB, SATA, SaS, etc. On or more storage compute devices 606-608 are coupled to the data bus 604. As shown for storage compute device 606, each of the devices 606-608 includes a data storage section 610 that facilitates persistently storing data objects on behalf of the host processor. The data objects being internally managed by the storage compute device 606. The storage compute devices 606-608 include two or more compute sections 612 that perform computations on the data objects, and a controller 614.

The controller 614 receives a definition of at least one data object and a compute object from the host processor 602. The data and compute objects may be persistently stored in the data storage section 610. The controller 614 associates a first key with the data object and a second key with the compute object. Both keys are stored on the data storage section 610, e.g., in a local database, along with metadata such as an address where the object data is stored. The controller 614 may thereafter receive a command from the host processor 602 to perform a computation that links the first and second key. This linkage may also be stored as metadata in the data storage section 610.

The computation is defined by the compute object and is performed on the data object via one or more of the compute sections 612 in response to the command. This computation may be part of a larger, distributed computation task being performed cooperatively by all the storage compute devices 606-608. For example, a very large matrix problem (e.g., involving a matrix with millions of rows and columns) may be broken into smaller portions which are distributed to the storage compute devices 606-608. The host processor 602 manages the distributed tasks, and coordinates updating individual storage compute devices 606-608 for iterative operations. In some embodiments, the host device 601 may be coupled to a network 618 via a network interface 616. Other network nodes (e.g., similarly configured host devices 620) of the network 618 may also be able to process the distributed computation tasks in parallel with the host device 601.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts or other diagrams presented herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method comprising:
   receiving a definition of at least one data object and a compute object from a host at a storage compute device;
   associating a first key with the at least one data object and a second key with the compute object;
   receiving a command from the host to perform a computation that links the first and second keys, the computation being defined by the compute object and acting on the at least one data object via the storage compute device;
   performing the computation using the compute object and the at least one data object in response to the command;
   storing metadata describing an optimization of the computation and linking the metadata with at least the second key;
   receiving a second command to perform a second computation that references the second key and a third key associated with a second data object, the second computation being defined by the compute object and being performed on the second data object; and
   reusing the optimization on the second computation.

2. The method of claim 1, wherein the computation comprises a mathematical transformation of the at least one data object.

3. The method of claim 1, wherein the at least one data object comprises two or more data objects, and wherein the computation comprises a mathematical combination of the two or more data objects.

4. The method of claim 3, wherein the two or more data objects comprise two or more matrices.

5. The method of claim 1, where the computation provides a resultant data object associated with a third key, the method further comprising linking the third key with the first and second keys.

6. The method of claim 2, wherein the at least one data object comprises a matrix.

7. A storage compute device, comprising:
   a memory unit that facilitates persistently storing data objects used in computations within the storage compute device;
   a computation engine that performs the computations on the data objects; and
   a processing unit coupled to the memory unit and the computation engine, the processing unit configured to:
   receive, from a host, a definition of at least one data object and a compute object that are stored in the memory unit;
   associate a first key with the at least one data object and a second key with the compute object;
   receive a command from the host to perform a computation that links the first and second keys, the computation being defined by the compute object and acting on the at least one data object;
   perform the computation via the computation engine using the compute object and the at least one data object in response to the command;
   store metadata describing an optimization of the computation and link the metadata with the at least the second key;
   receive a second command to perform a second computation that references the second key and a third key associated with a second data object, the second computation being defined by the compute object and being performed on the second data object; and
reuse the optimization on the second computation.

8. The storage compute device of claim 7, wherein the computation comprises a mathematical transformation of the at least one data object.

9. The storage compute device of claim 7, wherein the at least one data object comprises two or more data objects, and wherein the computation comprises a mathematical combination of the two or more data objects.

10. The storage compute device of claim 7, where the computation provides a result data object associated with a third key, the processing unit linking the third key with the first and second keys.

11. The storage compute device of claim 8, wherein the at least one data object comprises a matrix.

12. The storage compute device of claim 7, further comprising a legacy hard drive host interface, wherein the command and the definition are received via the legacy hard drive host interface.

13. The storage compute device of claim 7, wherein the two or more data objects comprise two or more matrices.

14. A system comprising:
a host processor; and
at least one storage compute device coupled to the host processor via a data bus, the at least one storage compute device comprising a controller configured to:
receive a definition of at least one data object and a compute object from the host processor;
associate a first key with the at least one data object and a second key with the compute object;
receive a command from the host processor to perform a computation that links the first and second keys, the computation being defined by the compute object and acting on the at least one data object; and
perform the computation using the compute object and the at least one data object on the at least one storage compute device in response to the command;
store metadata describing an optimization of the computation and link the metadata with the at least the second key;
receive a second command to perform a second computation that references the second key and a third key associated with a second data object, the second computation being defined by the compute object and being performed on the second data object; and
reuse the optimization on the second computation based on the stored metadata.

15. The system of claim 14, wherein the at least one storage compute device comprises a plurality of storage compute devices, and wherein the computation is part of a task distributed between the plurality of storage compute devices.

16. The system of claim 15, further wherein the plurality of storage compute devices are coupled to the host processor via a legacy hard drive host interface, wherein the command and the definition are received via the legacy hard drive host interface.

17. The system of claim 14, further comprising a network interface, and wherein the computation is part of a task distributed between a plurality of network nodes coupled via the network interface.

18. The system of claim 14, wherein the at least one data object comprises a matrix, and the computation comprises a mathematical transformation of the matrix.

19. The system of claim 14, wherein the at least one data object comprises two or more matrices, and the computation comprises a mathematical combination of the two or more matrices.

* * * * *